(12) United States Patent
Luz et al.

(10) Patent No.: US 9,046,307 B2
(45) Date of Patent: Jun. 2, 2015

(54) INTEGRATED SOLAR ENERGY THERMAL STORAGE SYSTEM AND METHODS

(71) Applicant: BRIGHTSOURCE INDUSTRIES (ISRAEL) LTD., Jerusalem (IL)

(72) Inventors: Moshe Luz, Petach Tikva (IL); Alon Ganany, Tel Aviv (IL)

(73) Assignee: BRIGHTSOURCE INDUSTRIES (ISRAEL) LTD., Jerusalem (IL)

( * ) Notice: Subject to any disclaimer, the term of this patent is extended or adjusted under 35 U.S.C. 154(b) by 226 days.

(21) Appl. No.: 13/873,319

(22) Filed: Apr. 30, 2013

(65) Prior Publication Data
US 2013/0292084 A1    Nov. 7, 2013

Related U.S. Application Data

(60) Provisional application No. 61/641,739, filed on May 2, 2012.

(51) Int. Cl.
| | |
|---|---|
| *F03G 6/00* | (2006.01) |
| *F01K 1/00* | (2006.01) |
| *F28D 20/00* | (2006.01) |
| *F03G 6/06* | (2006.01) |
| *F24J 2/07* | (2006.01) |
| *F24J 2/40* | (2006.01) |
| *F24J 2/16* | (2006.01) |
| *F24J 2/10* | (2006.01) |

(52) U.S. Cl.
CPC *F28D 20/00* (2013.01); *F03G 6/06* (2013.01); *F28D 2020/0047* (2013.01); *F24J 2/07* (2013.01); *F24J 2/16* (2013.01); *F24J 2/40* (2013.01); *F24J 2002/1076* (2013.01); *Y02E 10/41* (2013.01)

(58) Field of Classification Search
CPC ... F28D 20/00; F28D 2020/0047; F03G 6/06; F24J 2/40; F24J 2/07; F24J 2/16; F24J 2002/1076; Y02E 10/41
USPC ................................. 60/641.8–641.15, 659
See application file for complete search history.

(56) References Cited

U.S. PATENT DOCUMENTS

| | | | | |
|---|---|---|---|---|
| 4,455,826 | A * | 6/1984 | Knoos | 60/526 |
| 7,191,597 | B2 * | 3/2007 | Goldman | 60/641.8 |
| 7,654,073 | B2 * | 2/2010 | Primlani | 60/39.183 |
| 2011/0153095 | A1 * | 6/2011 | Rock et al. | 700/286 |
| 2012/0319410 | A1 * | 12/2012 | Ambrosek et al. | 290/1 R |

* cited by examiner

*Primary Examiner* — Hoang Nguyen
(74) *Attorney, Agent, or Firm* — Miles & Stockbridge P.C.; Mark A. Catan

(57) ABSTRACT

A solar energy thermal storage system can include a receiver in which a first storage medium is heated by insolation. First and second thermal storage reservoirs for a second storage medium can be provided. A first heat exchanger can be configured to transfer heat in the first storage medium to the second storage medium. A buffer tank can be located at a height above the receiver and can be fluidically connected to the first heat exchanger at its inlet and the receiver at its outlet. A second heat exchanger can be configured to transfer heat between the second storage medium and pressurized water and/or steam. The use of a buffer tank in conjunction with the first storage medium increases the overall efficiency of the system and results in a higher temperature for the thermal storage system, which can be used to generate superheated steam.

22 Claims, 7 Drawing Sheets

INTEGRATED SOLAR ENERGY THERMAL STORAGE SYSTEM AND METHODS

CROSS-REFERENCE TO RELATED APPLICATIONS

The present application claims the benefit of U.S. Provisional Application No. 61/641,739, filed May 2, 2012, which is incorporated by reference herein in its entirety.

FIELD

The present disclosure relates generally to energy production using solar insolation, and, more particularly, to storage of solar energy using thermal storage reservoirs.

SUMMARY

Insolation can be used to heat pressurized water to produce supercritical steam for use in generating electricity (e.g., via a steam turbine). During periods of relatively higher insolation, there can be more heat energy (i.e., enthalpy) in the supercritical steam than what is needed or desired for electricity generation or can be used within the capacity constraints of a provided power block. Alternatively or additionally, it may be desirable to store energy from insolation to supplement or independently provide electricity generation at a later time. In general, enthalpy in supercritical steam produced by the insolation can be stored in a thermal storage system (i.e., charging the storage system) for subsequent use, for example, during periods of relatively lower insolation or at times when supplemental electricity generation is desired (e.g., during peak demand periods or when higher energy prices are available). The use of a buffer tank located at a height above the molten salt receiver may allow for the molten salt to be easily and cheaply pumped to the top of the tower upon which the molten salt receiver is situated.

In one or more embodiments a solar energy system can have a solar receiver in which a first storage medium may be heated by insolation; a thermal energy storage system which may include a relatively cold thermal storage reservoir and a relatively hot storage reservoir configured to store a second storage medium; a first heat exchanger assembly including one or more heat exchangers which may be configured to transfer enthalpy in the first storage medium to the second storage medium; a buffer tank located at a height above the solar receiver, kept at atmospheric pressure, configured to hold the first storage medium and fluidically connected to the first heat exchanger assembly at its inlet and the first solar receiver at its outlet; and a second heat exchanger assembly including one or more heat exchangers, the second heat exchanger assembly configured to enable a heat transfer process between the second storage medium and pressurized water and/or steam during discharging. In some embodiments, the system may also include a second solar receiver in which pressurized feedwater is heated to generate superheated or supercritical steam by insolation. In this embodiment, the second heat exchanger assembly may be configured to enable a heat transfer process between the generated superheated steam and the second storage medium during charging. The system may further include an electricity generating system. The electricity generating system may include a turbine that uses steam to generate electricity, the electricity generating system being coupled to the second heat exchanger assembly so as to receive generated steam therefrom.

The system may further include a control system configured to control the thermal storage system. During a first operating period, the control system may control the thermal storage system such that the second storage medium flows from the cold reservoir through the first heat exchanger assembly to the hot reservoir so as to transfer enthalpy from the first storage medium flowing from the solar receiver to the second storage medium by way of the first heat exchanger assembly. At the same time, the second storage medium flows from the cold reservoir through the second heat exchanger assembly to the hot reservoir so as to transfer enthalpy from steam flowing from the second solar receiver to the second storage medium by way of the second heat exchanger assembly. During a second operating period, the control system may control the thermal storage system such that the second storage medium flows from the hot reservoir through the second heat exchanger assembly to the cold reservoir so as to transfer enthalpy from the second storage medium to pressurized water by way of the second heat exchanger. In some embodiments, during the first operating period, a portion of the first storage medium flows from the solar receiver through the second heat exchanger assembly so as to transfer enthalpy from the first storage medium to pressurized water and/or steam by way of the second heat exchanger assembly.

In some examples, both the first storage medium and the second storage medium are molten salt or molten metal. In some embodiments, the first storage medium and the second storage medium may be the same or different. In examples where the first and second storage medium are the same, the buffer tank may be fluidically connected to the thermal energy storage system.

In one or more embodiments of a method of thermal storage of solar energy, enthalpy from a first storage medium, which may be heated using solar insolation, may be transferred to a second storage medium so as to increase the temperature of the second storage medium. Additionally, enthalpy from a portion of a vapor-phase solar fluid at a pressure, which may be heated using solar insolation, may be transferred to the second storage medium so as to increase a temperature of the second storage medium. In the method, the first storage medium flows in a closed loop between a molten salt receiver, a first heat exchanger assembly and a buffer tank. The buffer tank may be positioned at a height above the molten salt receiver and kept at atmospheric pressure.

In embodiments, the first and the second storage medium includes at least one of a molten salt and a molten metal which may be maintained in a liquid phase in the storage reservoirs.

In one or more embodiments, a method of generating electricity using insolation can include, at a first operating period, generating steam using insolation, and using a first portion of the generated steam to drive a turbine so as to produce electricity. Another portion of the generated steam can be directed to a second heat exchanger in thermal communication with first and second thermal reservoirs in a thermal energy storage system. At a same time as the directing, a second storage fluid can be flowed from the first reservoir through the second heat exchanger to the second reservoir such that enthalpy in the another portion of the generated steam is transferred to the second storage fluid by way of the second heat exchanger. A first storage fluid may flow from a buffer tank through a molten salt receiver, wherein the storage fluid is heated using insolation. The first storage fluid and the second storage fluid may flow in their respective flowpaths through a first heat exchanger, such that enthalpy in the first storage fluid is transferred to the second storage fluid. The method can further include, at a second operating period, reverse-flowing the second storage fluid from the second storage reservoir through the second heat exchanger such that enthalpy in the second storage fluid is transferred by way of the second heat exchanger to generate steam. The steam generated by said reverse-flowing can then be used to drive the turbine so as to produce electricity. The storage medium can include at least one of a molten salt and a molten metal. An insolation level during the first operating period can be greater than that during the second operating period. The buffer tank may be positioned at a height above the molten salt receiver. The first and second reservoirs may be one of a fluid tank and a below grade pool.

In some embodiments, during the first operating period, the generation of the steam and the heating of the first storage fluid may include reflecting insolation onto at least one solar receiver using a plurality of heliostats.

The method can further include, at a third operating period, flowing pressurized feedwater together with the first thermal storage fluid along the respective flowpaths through the second heat exchanger such that the enthalpy in the first thermal storage fluid is transferred to the pressurized feedwater so as to produce steam. The steam from the second heat exchanger may be further heated using insolation on a solar receiver in order to generate superheated steam. The generated superheated steam can then be used to drive the turbine so as to produce electricity. The third operating period may correspond to a period of relatively high insolation on the solar receiver and when a thermal storage system containing the thermal storage fluid is fully charged.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some features have not been illustrated to assist in the illustration and description of underlying features. Throughout the figures, like reference numerals denote like elements.

DETAILED DESCRIPTION

Figure 1:
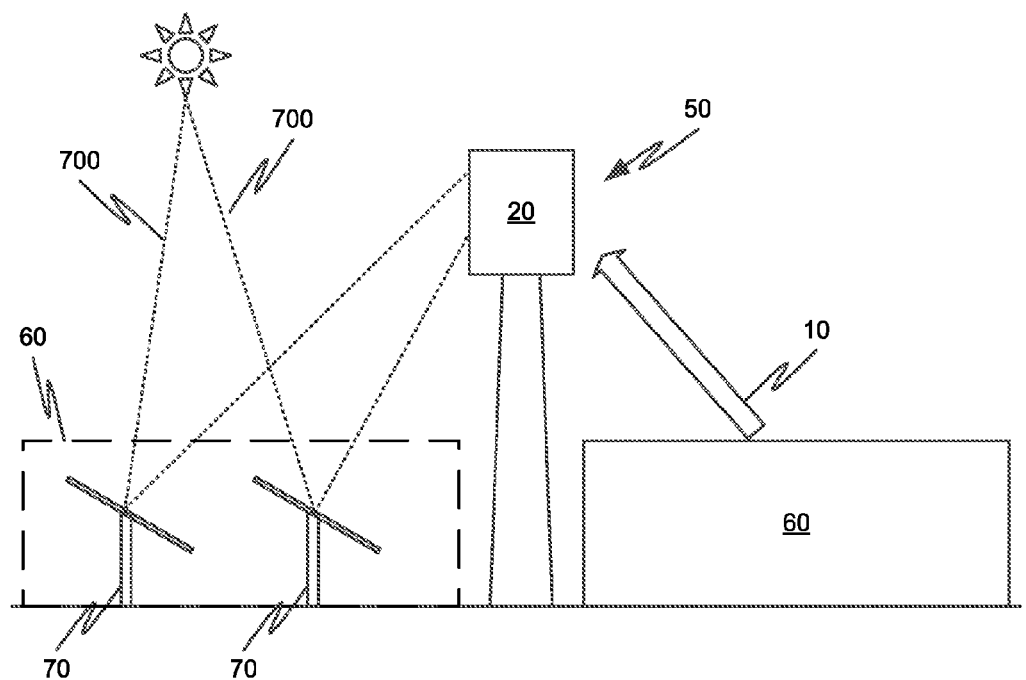
FIG. 1 shows a solar power tower system with a single tower, according to one or more embodiments of the disclosed subject matter.

Insolation can be used by a solar tower system to generate solar steam and/or for heating molten salt. In FIG. 1, a solar tower system can include a solar tower 50 that receives reflected focused sunlight 10 from a solar field 60 of heliostats (individual heliostats 70 are illustrated in the left-hand portion of FIG. 1 only). For example, the solar tower 50 can have a height of at least 25 meters, 50 meters, 75 meters, 100 meters, 150 meters or higher. The heliostats 70 can be aimed at solar energy receiver system 20, for example, a solar energy receiving surface of one or more receivers of system 20. Heliostats 70 can adjust their orientation to track the sun as it moves across the sky, thereby continuing to reflect sunlight onto one or more aiming points associated with the receiver system 20. A solar energy receiver system 20, which can include one or more individual receivers, can be mounted in or on solar tower 50. The solar receivers can be constructed to heat water and/or steam and/or supercritical steam and/or a thermal storage medium and/or any other type of solar fluid using insolation received from the heliostats.

Figure 2:
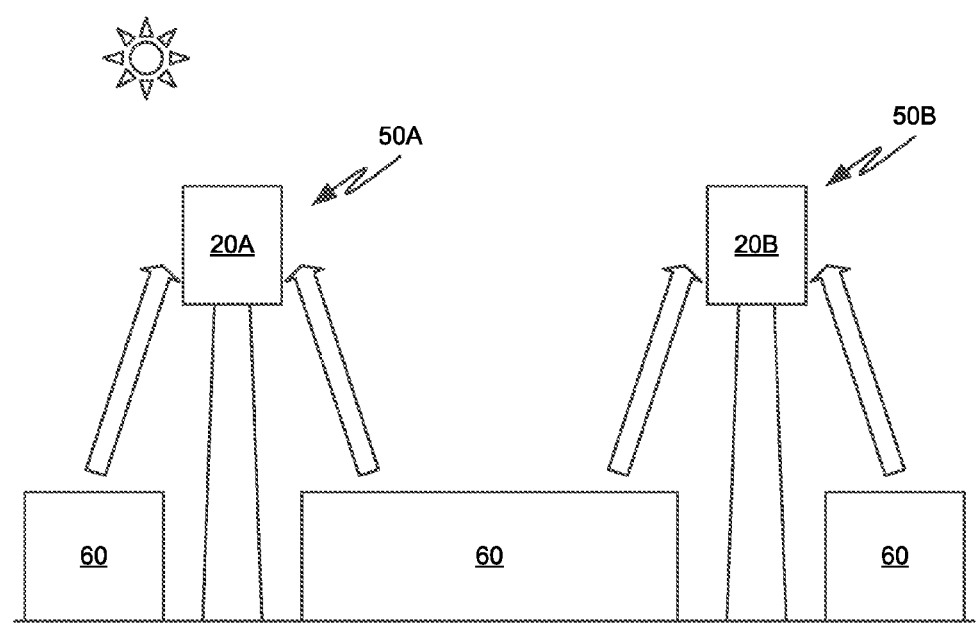
FIG. 2 shows a solar power tower system including multiple towers, according to one or more embodiments of the disclosed subject matter.

In some embodiments, the different solar energy receiving systems can have different functionalities. For example, one of the solar energy receiving systems can heat water using the reflected solar radiation to generate steam and/or superheat steam while another of the solar energy receiving systems can serve to heat a thermal storage medium using the reflected solar radiation. For example, the thermal storage medium can be a molten salt and/or molten metal and/or other high temperature (i.e., >250° C.) substantially liquid medium. The multiple solar towers 50 can share common heliostat fields 60 or have respective separate heliostat fields. Some of the heliostats can be constructed and arranged so as to alternatively direct insolation at solar energy receiving systems in different towers. In addition, the heliostats can be configured to direct insolation away from any of the towers, for example, during a dumping condition. As shown in FIG. 2, two solar towers can be provided, each with a respective solar energy receiving system. A first tower 50A has a first solar energy receiving system 20A while a second tower 50B has a second solar energy receiving system 20B. The solar towers 50A, 50B are arranged so as to receive reflected solar radiation from a common field of heliostats 60. At any given time, a heliostat within the field of heliostats 60 can be directed to a solar receiver of any one of the solar towers 50A, 50B. Although only two solar towers with respective solar energy receiving systems are shown in FIG. 2, any number of solar towers and solar energy receiving systems can be employed.

Figure 3:
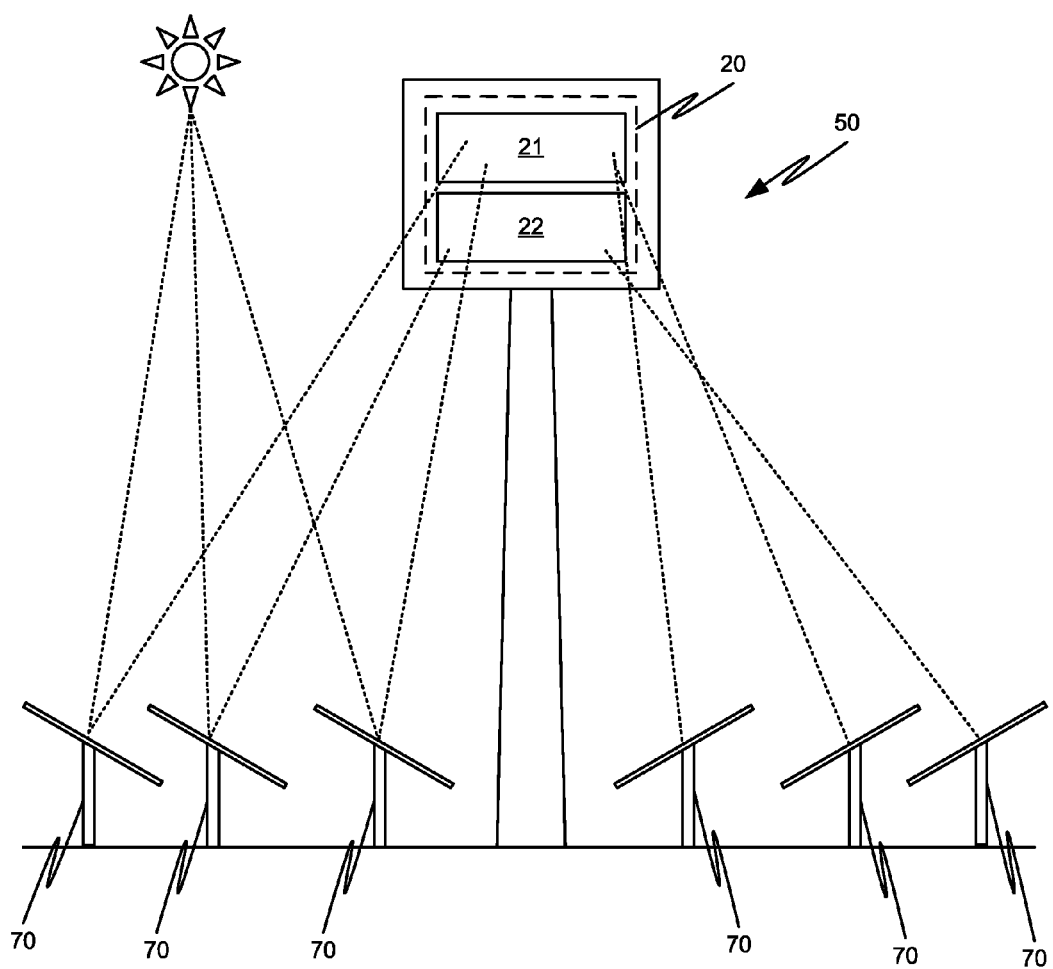
FIG. 3 shows a solar power tower system including multiple receivers in a single tower, according to one or more embodiments of the disclosed subject matter.

More than one solar receiver can be provided on a single solar tower. The multiple solar receivers in combination can form a part of the solar energy receiving system 20. The different solar receivers can have different functionalities. For example, one of the solar receivers can heat water using the reflected solar radiation to generate steam while another of the solar receivers can serve to heat a thermal storage medium using the reflected solar radiation. The multiple solar receivers can be arranged at different heights on the same tower or at different locations (e.g., different faces, such as a north face, a west face, etc.) on the same tower. Some of the heliostats in field 60 can be constructed and arranged so as to alternatively direct insolation at the different solar receivers. As shown in FIG. 3, two solar receivers can be provided on a single tower 50. The solar energy receiving system 20 thus includes a first solar receiver 21 and a second solar receiver 22. At any given time, heliostats 70 can be aimed at one or both of the solar receivers, or at none of the receivers. In some use scenarios, the aim of a heliostat 70 can be adjusted so as to move a centroid of the reflected beam projected at the tower 50 from one of the solar receivers (e.g., 21) to the other of the solar receivers (e.g., 22). Although only two solar receivers and a single tower are shown in FIG. 3, any number of solar towers and solar receivers can be employed.

Figure 4:
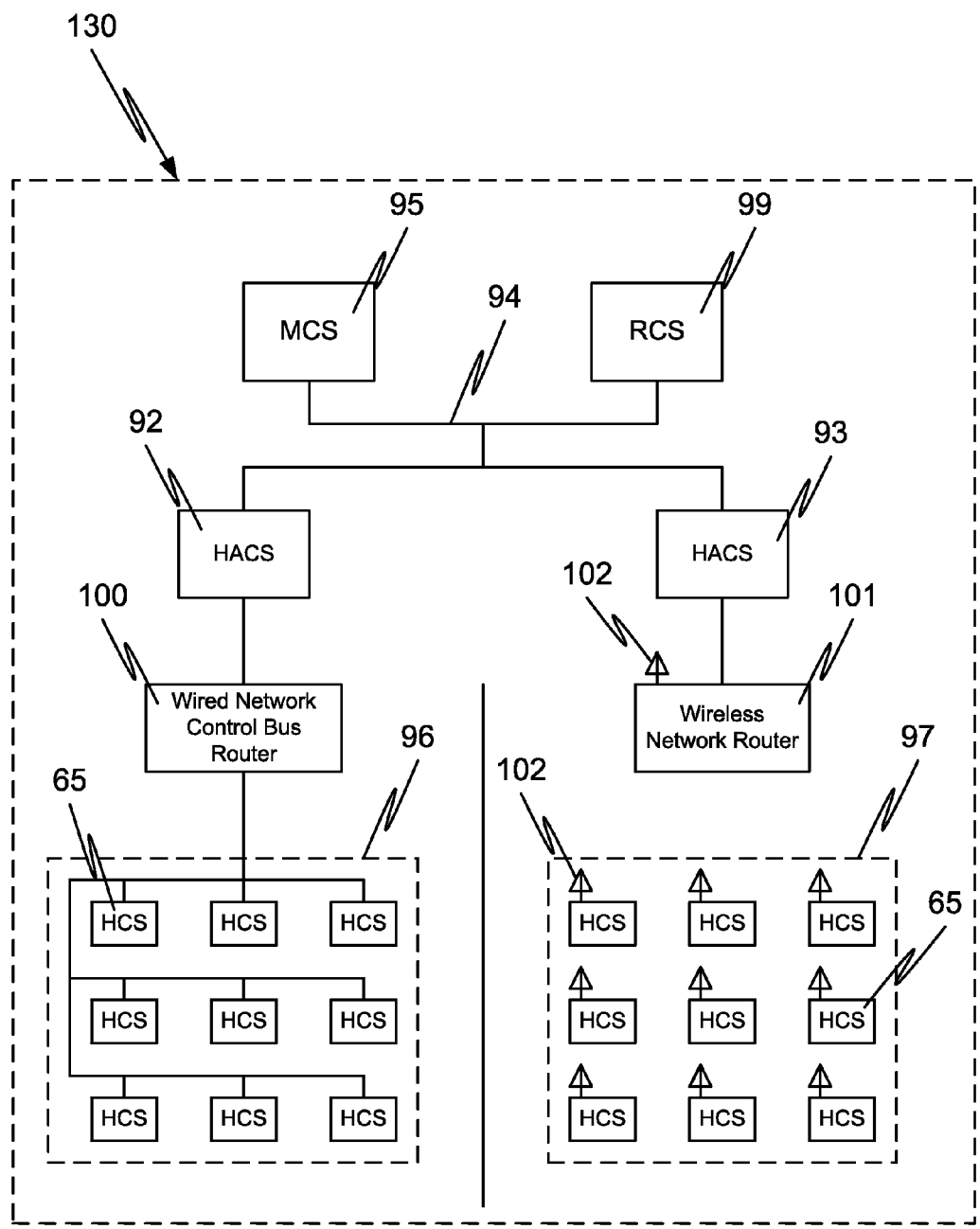
FIG. 4 is a schematic diagram of a heliostat control system, according to one or more embodiments of the disclosed subject matter.

Heliostats 70 in a field of heliostats can be controlled through a central heliostat field control system 130, for example, as shown in FIG. 4. For example, a central heliostat field control system 130 can communicate hierarchically through a data communications network with controllers of individual heliostats. Additionally or alternatively, the heliostat field can be controlled by any combination or variation on centralized control and distributed control, for example, by using a control system that communicates hierarchically through a data communications network with individual or final controllers for each heliostat.

FIG. 4 illustrates a hierarchical control system 130 that includes three levels of control hierarchy, although in other implementations there can be more or fewer levels of hierarchy, and in still other implementations the entire data communications network can be without hierarchy, for example, in a distributed processing arrangement using a peer-to-peer communications protocol. At a lowest level of control hierarchy (i.e., the level provided by heliostat controller) in the illustration there are provided programmable heliostat control systems (HCS) 65, which control the two-axis (azimuth and elevation) movements of heliostats (not shown), for example, as they track the movement of the sun. At a higher level of control hierarchy, heliostat array control systems (HACS) 92, 93 are provided, each of which controls the operation of heliostats 70 (not shown) in heliostat fields 96, 97, by communicating with programmable heliostat control systems 65 associated with those heliostats 70 through a multipoint data network 94 employing a network operating system such as CAN, Devicenet, Ethernet, or the like. At a still higher level of control hierarchy a master control system (MCS) 95 is provided which indirectly controls the operation of heliostats in heliostat fields 96, 97 by communicating with heliostat array control systems 92, 93 through network 94. Master control system 95 further controls the operation of a solar receiver (not shown) by communication through network 94 to a receiver control system (RCS) 99.

In FIG. 4, the portion of network 94 provided in heliostat field 96 can be based on copper wire or fiber optic connections, and each of the programmable heliostat control systems 65 provided in heliostat field 96 can be equipped with a wired communications adapter, as are master control system 95, heliostat array control system 92 and wired network control bus router 100, which is optionally deployed in network 94 to handle communications traffic to and among the programmable heliostat control systems 65 in heliostat field 96 more efficiently. In addition, the programmable heliostat control systems 65 provided in heliostat field 97 communicate with heliostat array control system 93 through network 94 by means of wireless communications. To this end, each of the programmable heliostat control systems 65 in heliostat field 97 is equipped with a wireless communications adapter 102, as is wireless network router 101, which is optionally deployed in network 94 to handle network traffic to and among the programmable heliostat control systems 65 in heliostat field 97 more efficiently. In addition, master control system 95 is optionally equipped with a wireless communications adapter (not shown).

Insolation can vary both predictably (e.g., diurnal variation) and unpredictably (e.g., due to cloud cover, dust, solar eclipses, or other reasons). During these variations, insolation can be reduced to a level insufficient for heating a solar fluid, for example, producing steam for use in generating electricity. To compensate for these periods of reduced insolation, or for any other reason, thermal energy produced by the insolation can be stored in a fluid-based thermal storage system for use at a later time when needed. The thermal storage system can store energy when insolation is generally available (i.e., charging the thermal storage system) and later release the energy to heat a solar fluid (e.g., water or carbon dioxide) in addition to or in place of insolation. For example, it can be possible at times of reduced insolation to replace the radiative heating by insolation of the solar fluid in the solar collection system with conductive and/or convective heat transfer of thermal energy (i.e., enthalpy) from a thermal storage system to the solar fluid. Although the term solar fluid is used herein to refer to the fluid heated in the solar collection system, it is not meant to require that the solar fluid actually be used to produce work (e.g., by driving a turbine). For example, the solar fluid as used herein can release heat energy stored therein to another fluid which can in turn be used to produce useful work or energy. The solar fluid can thus act as a heat transfer fluid or a working fluid.

A molten salt solar energy system generally includes a molten salt solar receiver, heliostats, a cold storage tank, a hot storage tank, and an energy conversion system. A high temperature molten salt and/or molten metal can be used as the heat transfer medium in the system. The use of high temperature molten salt and/or molten metal may allow for the production of electricity up to 24 hours a day and also allows for operations at sufficiently high temperatures so that the heat energy stored in the molten salt and/or molten metal can be used in order to produce superheated and/or supercritical steam, through the use of heat exchangers.

The thermal storage medium can be initially stored in a cold storage tank. For example, when needed, the heat transfer medium can be pumped to the molten salt receiver, wherein it is heated by solar radiation. The heat transfer medium, e.g. molten salt, generally has a relatively high specific gravity (for example, 2.0). As such, a significant amount of energy would be required to pump the molten salt to the molten salt receiver positioned on a tower. In some examples, it may be required to pressurize the molten salt to a pressure of at least 50 bar, 75 bar, 100 bar, or more, in order for the salt to reach the molten salt receiver from the cold tank storage located at ground level. The pump would then need to be a high volume, high pressure pump. These types of pumps are generally expensive and require a large amount of electricity to operate. By having a buffer tank positioned above the molten salt receiver and kept at atmospheric pressure a small volume high pressure pump may be used to direct the thermal storage medium from the first reservoir to the buffer tank and a simpler high volume low pressure pump may be used to pump the thermal storage medium to the molten salt receiver from the buffer tank. The high pressure pump may operate at a pressure that is approximately between 2 and 5 times greater than the low pressure pump.

After the heat transfer medium has been heated to its desired temperature in the molten salt receiver, the heat transfer medium is pumped to the hot storage tank, where it is stored until needed by the energy conversion system. In order to produce energy, the hot heat transfer medium is pumped to a heat exchanger where the thermal energy from the hot heat transfer medium is transferred to pressurized water and/or a mixture of pressurized water and steam and/or steam flowing through the heat exchanger where it is heated. The heated steam may then be sent through a steam turbine in order to generate electricity.

After the heat transfer medium has passed through the heat exchange, the extracted thermal energy results in a heat transfer medium at a cooler temperature. The heat transfer medium returns to the cold storage tank. The heat transfer medium is reused and is stored in the cold storage tank until needed.

The heat transfer medium may be a molten salt and/or molten metal capable of being heated to high temperatures. However, at the same time the heat transfer medium may have a relatively high melting point. In some examples, the melting point may be between 140-320° C. It would therefore be required to maintain the heat transfer medium as well as all of the equipment that would come in contact with the heat transfer medium above the melting point, in order to prevent the heat transfer medium from solidifying. Solidification of the heat transfer medium may block-up and damage the equipment (i.e., piping, pump, etc.).

According to some embodiments, it may be necessary to preheat the piping of the receiver prior to system startup so as to prevent the heat transfer medium from freezing within the receiver tubes as well as to eliminate thermal shock to the receiver tubes. It is known to use heat tracing to heat different system components. However, this type of technology is not feasible for the receiver tubes as it would require the external face of the receiver tubes which receive the reflected solar radiation to be at least partially blocked from receiving reflected radiation.

In some embodiments, the receiver tubes may be heated by running an electric current through the tubes. This is commonly known as Joule heating. It may be possible to heat the receiver tubes to temperatures above the melting point of the heat transfer medium by applying an electric current with a relatively low voltage. For example, the electric current may be applied at 1 volt, 1.5 volts, 2 volts, 2.5 volts, 5 volts, 24 volts or 48 volts or greater (safe levels of voltage). In other examples, the electric current may be applied at higher voltages such as 110 volts or 240 volts or greater (however, this would require insulation). The electric current may be applied to each receiver tube individually or alternatively the current may run through a location where the receiver tubes are joined together (e.g. an inlet header and/or an outlet header). In some embodiments, the electric contacts may be placed at one end of the tube, or both ends of the tubes, or anywhere along the length of the receiver tubes. Alternatively or additionally, the inlet header and/or the outlet header may be heated via induction heating. In some embodiments, electric coils may be wound around the header and a high frequency AC current may then be applied through the coils. Eddy currents in the header formed by the electric current may then result in the heating of the header.

In one or more embodiments, the thermal storage system includes at least two separate thermal storage reservoirs, which can be substantially insulated to minimize heat loss therefrom. A thermal storage medium can be distributed among or in one of the two storage reservoirs. For example, the thermal storage medium can be a molten salt and/or molten metal and/or other high temperature (i.e., >250° C.) substantially liquid medium. The thermal storage medium may be heated by radiative heat transfer via the molten salt receiver or by convective or conductive heat transfer from the solar fluid in a heat exchanger. This net transfer of enthalpy to the thermal storage medium in the thermal storage system is referred to herein as charging the thermal storage system. At a later time when insolation decreases, the direction of heat exchange can be reversed to transfer enthalpy from the thermal storage medium to the solar fluid via the same or a different heat exchanger. This net transfer of enthalpy from the thermal storage medium of the thermal storage system is referred to herein as discharging the thermal storage system. Each thermal storage reservoir can be, for example, a fluid tank or a below-grade pool.

Figure 5A:
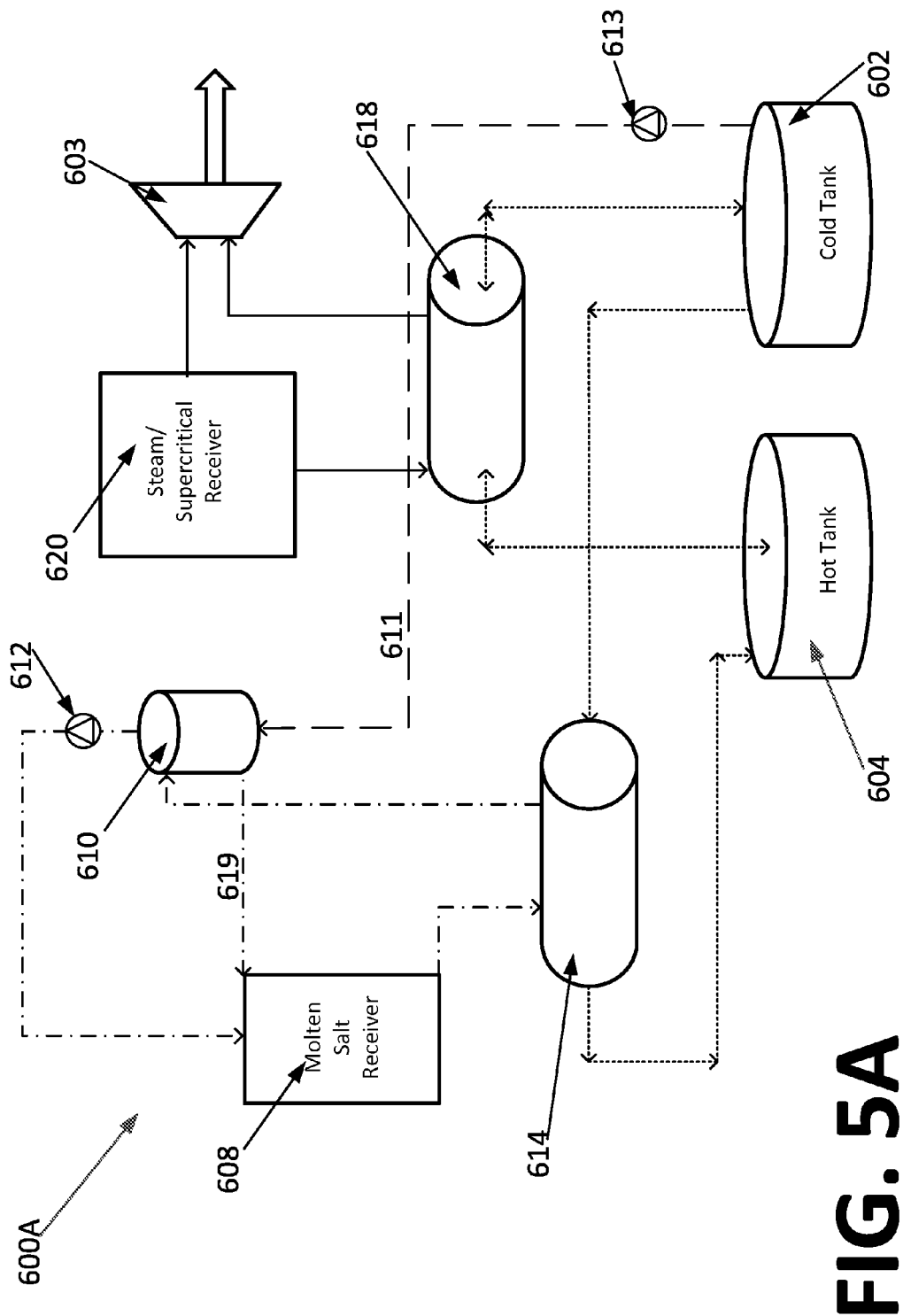
FIG. 5A shows a first configuration for various components of a solar energy system according to one or more embodiments of the disclosed subject matter.

Referring to FIG. 5A, a solar energy system 600A with fluid tanks as the thermal storage reservoir is shown. A first fluid tank 602 can be considered a relatively cold reservoir, in that the temperature during the charging and/or discharging modes is maintained at substantially a temperature of $T_C$, which is the lowest temperature in the thermal storage system. A second fluid tank 604 can be considered a relatively hot reservoir, in that the temperature during the charging and/or discharging modes is maintained at substantially a temperature of $T_H$, which is the highest temperature in the thermal storage system.

In some embodiments, the thermal storage medium in the primary cycle may be the same as the thermal storage medium in the secondary cycle. Alternatively, the thermal storage medium in the primary cycle may be different from the thermal storage medium in the secondary cycle. The choice of thermal storage medium may be dependent on the desired heat transfer properties. For example, in the secondary cycle, the thermal storage medium may be chosen based on its compatibility with the heat transfer properties of the water/steam. The thermal storage medium in the primary cycle may then be chosen based on the thermal storage medium chosen for the secondary cycle. In some embodiments, the thermal storage medium in the primary cycle may be chosen based on the optimal operating temperature of the molten salt receiver.

The system may comprise a primary cycle (illustrated by dash-dot lines in the figure), and a secondary cycle (illustrated by dotted lines in the figure). In the primary cycle the thermal storage medium is heated in a molten salt receiver 608. Insolation may be used to heat the thermal storage medium (for example, molten salt). Prior to system startup, the primary cycle may be initiated by flowing the thermal storage medium from the colder reservoir 602 to a buffer tank 610 via line 611. A high pressure, low volume pump 613 may be used to transfer the thermal storage medium from cold reservoir 602 to buffer tank 610 for initial filling of buffer tank 610 and startup of the system.

The buffer tank 610 may be located at a height above molten salt receiver 608. In some embodiments, only a portion of the buffer tank is at a height above the molten salt receiver. A salt circulation pump 612 is used to pump the thermal storage medium from the buffer tank 610 to molten salt receiver 608. Buffer tank 610 may be kept at atmospheric pressure. As a result of the height differential, pump 612 may be a low pressure pump (i.e., relatively cheap, and low electricity usage).

In the primary cycle, the heated thermal storage medium may then flow to a first heat exchanger 614. Within first heat exchanger 614, there may be an enthalpy exchange between the heated thermal storage medium in the primary cycle and the thermal storage medium in the secondary cycle. After the enthalpy exchange, the cooled thermal storage medium in the primary cycle returns to buffer tank 610.

In some embodiments, there may be sudden loss of electricity to the system. In such a case, pump 612 may not be able to supply the thermal storage medium to the molten salt receiver 608. In such an instance there is risk of damage to molten salt receiver if there is no thermal storage medium flowing to the tubes of molten salt receiver 608. In order prevent damage in such a case, an emergency flush line 619 may be fluidically connect the bottom of buffer tank 610 with molten salt receiver 608. In essence, due to the buffer tank being located at a height above the molten salt receiver, the thermal storage medium will flow from the buffer tank through the molten salt receiver without the need for a pump. In other embodiments, an uninterruptible power supply (UPS) may be used to power pump 612.

During the charging phase, the thermal storage medium in the secondary cycle can be transferred from the cold reservoir 602 to the hot reservoir 604 via the first heat exchanger 614. As mentioned above, there may be an enthalpy exchange between the thermal storage medium in the primary cycle and the thermal storage medium in the secondary cycle.

In one or more embodiments, the system may further include a solar receiver 620, wherein pressurized water may be heated by insolation such that the pressurized water is evaporated and/or superheated. A first portion of the pressurized superheated steam is sent to a steam turbine 603, for example, to generate electricity. Steam and/or water at a reduced temperature and/or pressure can exit the turbine 603 and return to the solar receiver 620 to be re-heated. A second portion of the pressurized superheated steam is sent to a second heat exchanger 618. Within the second heat exchanger 618, enthalpy of the superheated steam is used to heat thermal storage medium in the secondary cycle. Examples of the use of water/steam based solar receiver to heat a thermal storage medium are described in detail, for example in International Patent Application No. PCT/IB2012/050026 filed Jan. 3, 2012, and published as WO-2012/093354, which is hereby incorporated by reference in its entirety.

Within the second heat exchanger 618, the enthalpy transferred from the steam can be used to heat thermal storage medium from an initial temperature to a final destination temperature.

As the thermal storage medium in the secondary cycle is heated, it travels between the reservoirs. For example, heating/cooling of storage medium by enthalpy exchange can occur when the storage medium is en route between the cold reservoir 602 and the hot reservoir 604.

In some embodiments, the storage medium in the secondary cycle may flow from cold reservoir 602 through first heat exchanger 614 wherein it is heated by the storage medium in the primary cycle. It may then directly flow to second heat exchanger 618 wherein it may be further heated by the pressurized superheated steam. The further heated storage medium may then flow to hot reservoir 604.

During the discharging phase, the thermal storage medium in the secondary cycle may flow from hot reservoir 604 through the second heat exchanger 618 wherein it comes into thermal contact with pressurized water and/or a mixture of water and steam and/or steam to produce superheated steam and/or supercritical steam. The superheated steam and/or supercritical steam may be used to produce electricity via, for example, a steam turbine 603. Alternatively, the superheated steam and/or supercritical steam may also be used in any known industrial process such as for example enhanced oil recovery.

Figure 5B:
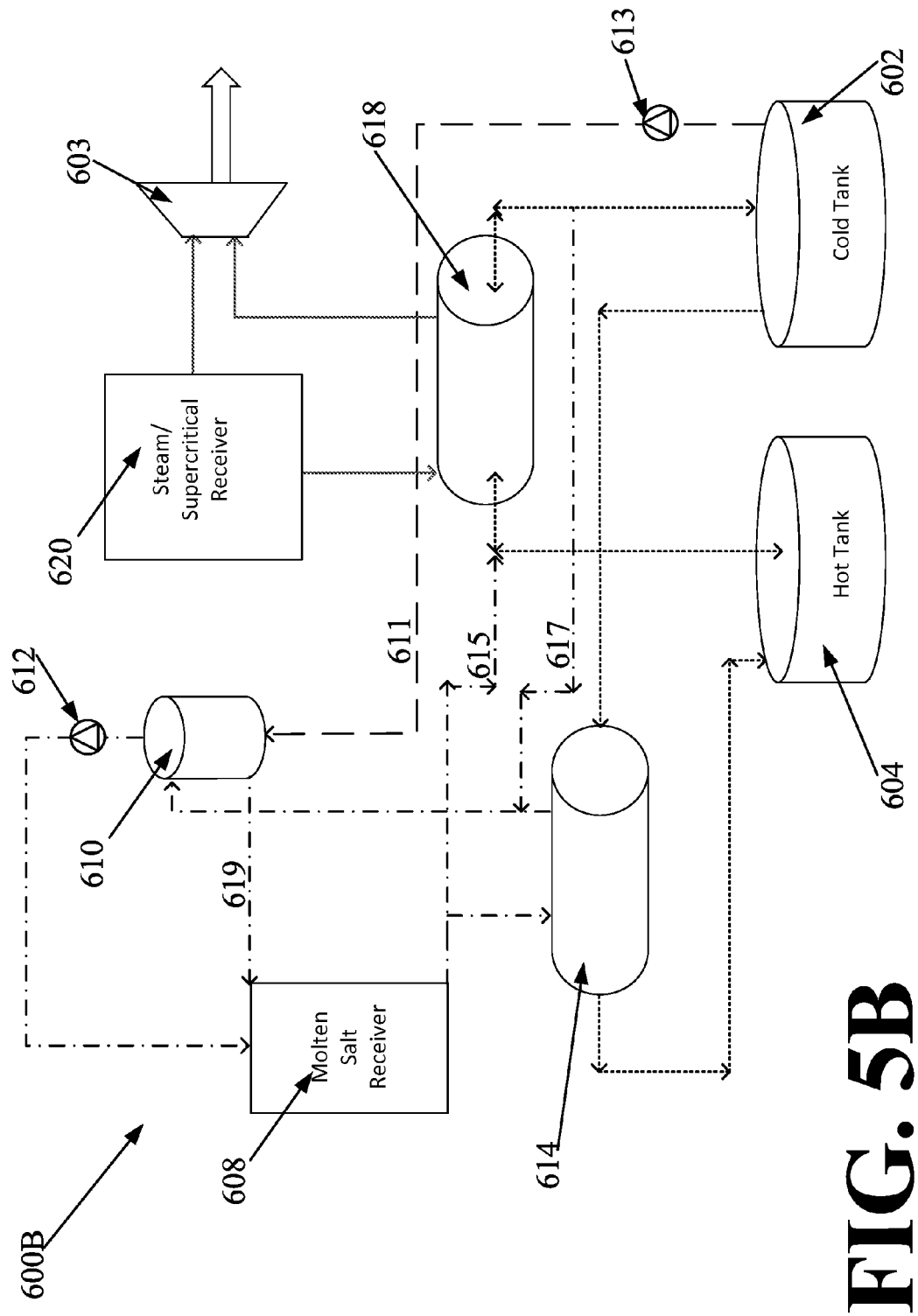
FIG. 5B shows a second configuration for various components of a solar energy system according to one or more embodiments of the disclosed subject matter.

In some embodiments, as shown as solar energy system 600B in FIG. 5B, it may be desirable for the thermal storage medium heated in molten salt receiver 608 to be directed to second heat exchanger 618 via line 615. A first portion of the heated thermal storage medium in the primary cycle may flow into first heat exchanger 614 wherein it comes into thermal contact with the thermal storage medium in the secondary cycle thereby heating the thermal storage medium in the secondary cycle. A second portion of the heated storage medium in the primary cycle may flow directly into second heat exchanger 618 via line 615 wherein it comes into thermal contact with pressurized water and/or a mixture of water and steam and/or steam to produce superheated steam and/or supercritical steam. The system may further include line 617 which may direct thermal storage medium from cold reservoir 602 to buffer tank 610 in order to replenish the thermal storage medium in the primary cycle which was directly used to produce superheated steam in the second heat exchanger 618.

The direct fluid communication between the thermal storage medium in the primary cycle and second heat exchanger 618, as shown in FIG. 5B, may be useful in instances where insufficient insolation is available to produce steam and/or superheated steam and/or supercritical steam in the second receiver 620. In certain embodiments, where receiver 620 produces supercritical steam, thermal storage medium from molten salt receiver 608 may be used as a reheater such that there is an enthalpy exchange between the hot thermal storage medium in the primary cycle (line 615) and the steam after it flows from the steam turbine.

Figure 5C:
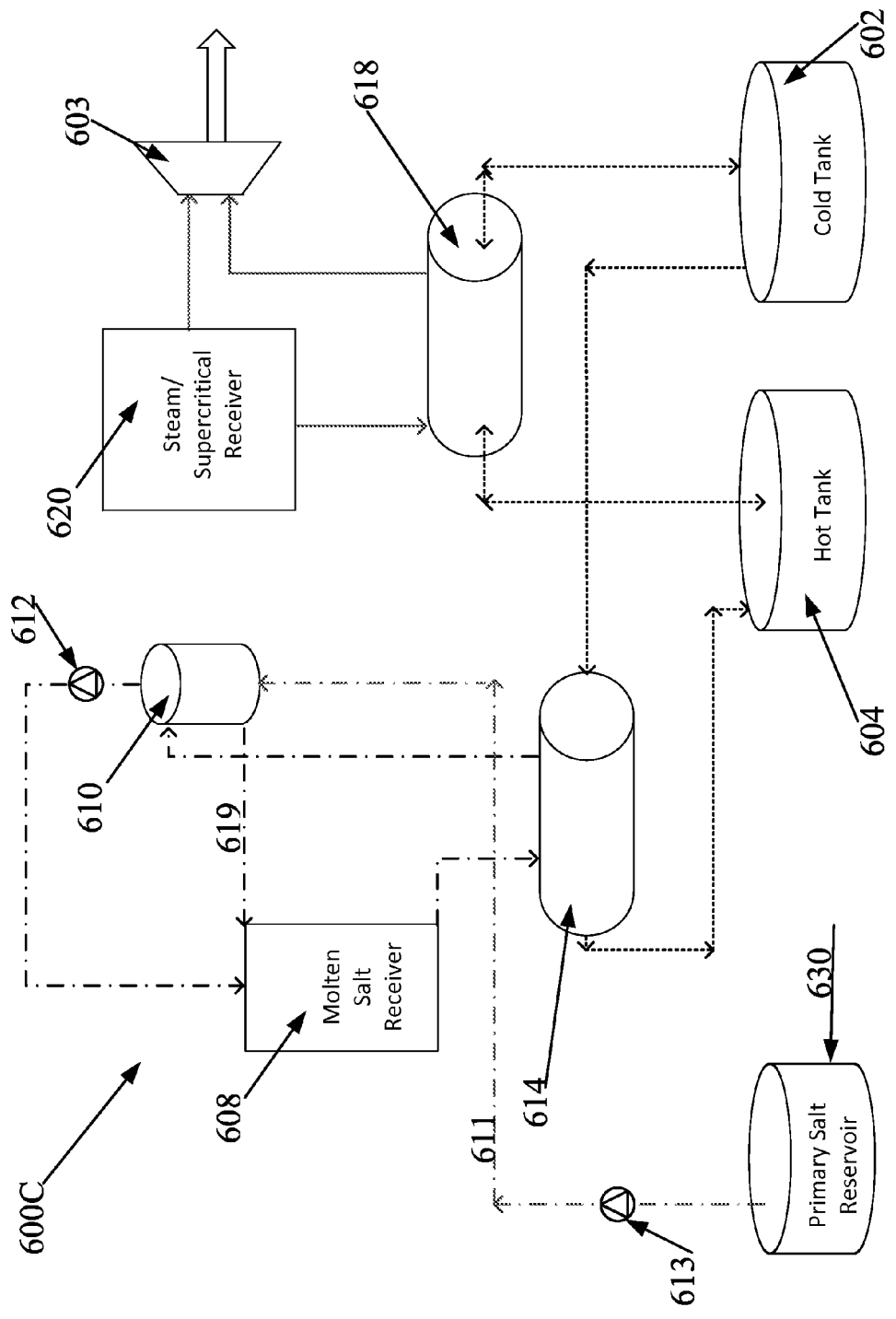
FIG. 5C shows a third configuration for various components of a solar energy system according to one or more embodiments of the disclosed subject matter.

With reference to FIG. 5C, the solar energy system 600C may comprise a primary cycle (illustrated by dash-dot lines in the figure), and a secondary cycle (illustrated by dotted lines in the figure). In some embodiments, the thermal storage medium in the primary cycle may be different than the thermal storage medium in the secondary cycle. The thermal storage medium used in the primary cycle may be stored in primary salt reservoir 630. Prior to system startup, the primary cycle may be initiated by flowing the thermal storage medium from reservoir 630 to a buffer tank 610. A high pressure, low volume pump 613 may be used to transfer the thermal storage medium from reservoir 630 to buffer tank 610 via line 611.

In such an embodiment, it may be possible that the thermal storage medium used in the primary cycle can be heated to higher temperatures than the thermal storage medium in the secondary cycle. For example, the thermal storage medium in the primary cycle may be heated to temperatures as high as 400° C., 500° C., 550° C., 600° C. or greater. The thermal storage medium in the secondary cycle may be heated to temperatures as high as 200° C., 300° C., 400° C., 500° C. or greater. As such, a smaller quantity of thermal storage medium would be needed in the primary cycle than in the secondary cycle.

Figure 5D:
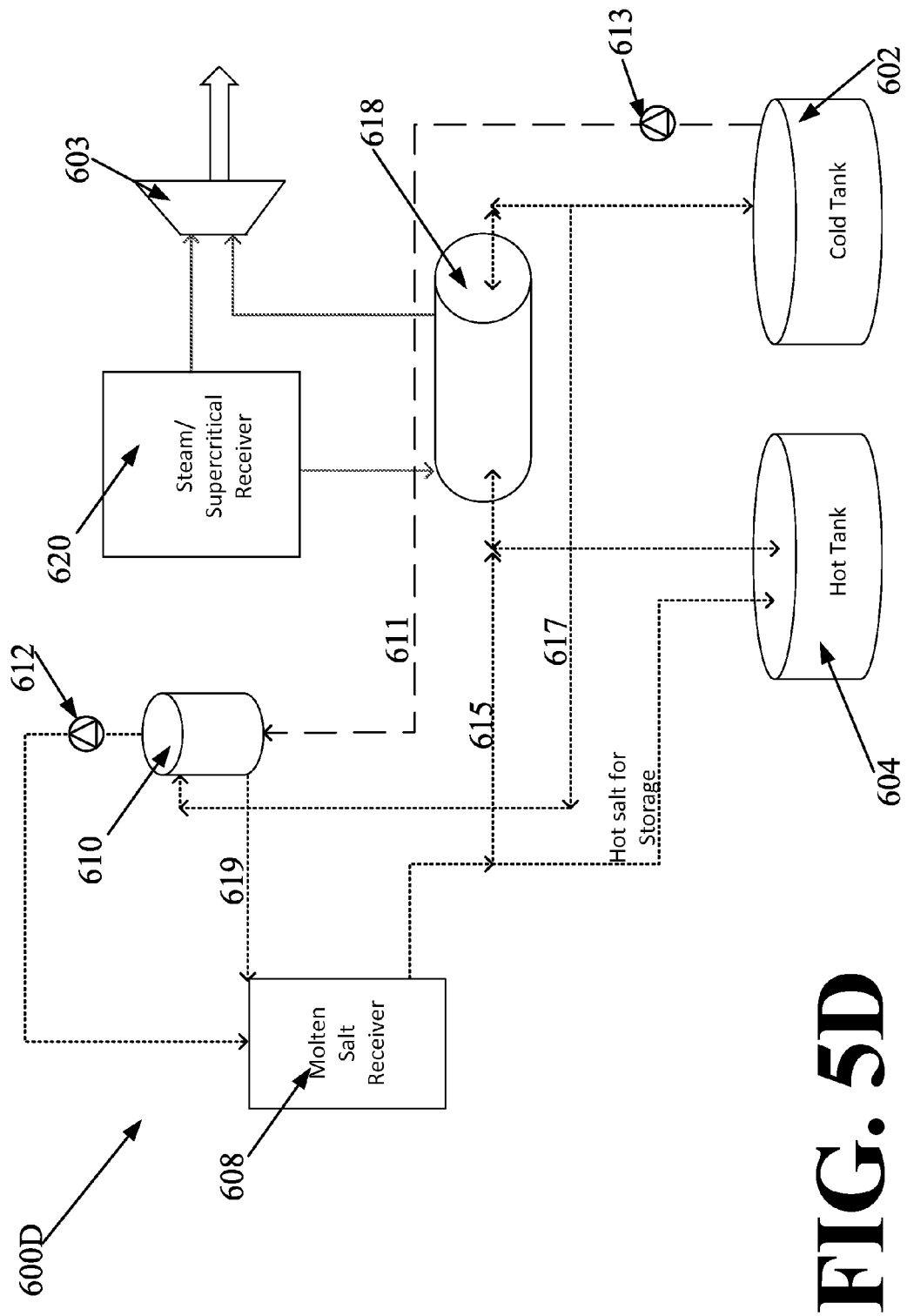
FIG. 5D shows a fourth configuration for various components of a solar energy system according to one or more embodiments of the disclosed subject matter.

With reference to FIG. 5D, solar energy system 600D may include a first reservoir 602 and a second reservoir 604. First fluid reservoir 602 can be considered a relatively cold reservoir, in that the temperature during the charging and/or discharging modes is maintained at substantially a temperature of $T_C$, which is the lowest temperature in the thermal storage system. Second fluid reservoir 604 can be considered a relatively hot reservoir, in that the temperature during the charging and/or discharging modes is maintained at substantially a temperature of $T_H$, which is the highest temperature in the thermal storage system.

The system 600D may comprise a single cycle, which does not include the first heat exchanger 614 as described in FIGS. 5A-5C. The thermal storage medium is heated in a molten salt receiver 608 via, for example, insolation. Prior to system startup the cycle may be initiated by flowing the thermal storage medium from the colder reservoir 602 to a buffer tank 610 via line 611. The buffer tank 610 may be located at a height above molten salt receiver 608. In some embodiments, only a portion of the buffer tank is at a height above the molten salt receiver. A storage medium circulation pump 613 is used to pump the thermal storage medium from the buffer tank 610 to molten salt receiver 608. Buffer tank 608 may be kept at atmospheric pressure. As a result of the height differential, pump 612 may be a low pressure pump (i.e. relatively cheap and low electricity usage).

During the charging phase, the thermal storage medium can be transferred from the cold reservoir 602 to the hot reservoir 604 via the buffer tank 610 and the molten salt receiver 608.

A portion of the heated thermal storage medium may be directed via line 615 to the second heat exchanger 618 wherein it comes into thermal contact with pressurized water and/or a mixture of pressurized water and steam and/or superheated steam and/or supercritical fluid. Line 617 may direct thermal storage medium from cold reservoir 602 to buffer tank 610 in order to replenish the thermal storage medium in the buffer tank which was used to produce superheated steam and/or supercritical steam in the second heat exchanger 618. A second portion of the heated thermal storage medium may flow directly to the second reservoir 608

In one or more embodiments, the system may further include a solar receiver 620, wherein pressurized water may be heated by insolation such that the pressurized water is evaporated and/or superheated. A first portion of the pressurized superheated steam can be sent to a steam turbine 603, for example, to generate electricity. Steam and/or water at a reduced temperature and/or pressure can exit the turbine 603 and return to the solar receiver 620 to be re-heated. A second portion of the pressurized superheated steam can be sent to second heat exchanger 618. Within the second heat exchanger 618, enthalpy of the superheated steam and/or supercritical steam is used to the heat thermal storage medium. Examples of the use of water/steam based solar receiver to heat a thermal storage medium are described in detail, for example in International Patent Application No. PCT/IB2012/050026 incorporated by reference above.

Within the second heat exchanger 618, the enthalpy transferred from the steam can be used to heat thermal storage medium from an initial temperature to a final destination temperature. As the thermal storage medium is heated, it travels between the reservoirs. For example, the thermal storage medium may be heated via the molten salt receiver and/or via an enthalpy exchange between superheated steam and/or supercritical steam and "cold" thermal storage medium as it flows between the cold reservoir 602 and the hot reservoir 604.

During the discharging phase, the thermal storage medium in the secondary cycle may flow from hot reservoir 604 through the second heat exchanger 618 wherein it comes into thermal contact with pressurized water and/or a mixture of water and steam and/or steam to produce superheated steam and/or supercritical steam. The superheated steam and/or supercritical steam may be used to produce electricity via for example a steam turbine 603.

The enthalpy remaining in the solar fluid after charging the thermal storage system can be applied to other uses within the system, such as, but not limited to, preheating solar fluid, supplementing solar receiver inputs, domestic or industrial applications, and fuel production or extraction.

Although a single conduit is shown in the figures, multiple fluid conduits can be provided in parallel, such that fluid flowing between the reservoirs can be distributed across the multiple conduits. Alternatively or additionally, multiple fluid conduits can be provided in parallel, but with fluid flow in one conduit being opposite to that in the other conduit. The direction of the net flow between the reservoirs (i.e., the flow in the forward conduit(s) minus the flow in the reverse conduit(s)) can depend on the particular mode of operation. For example, the net flow in the charging phase can be from the colder reservoir to the hotter reservoir and reversed in the discharging phase.

One or more pumps (not shown) can be included for moving the thermal storage medium between reservoirs. Additional flow control components can also be provided, including, but not limited to, valves, switches, and flow rate sensors. Moreover, a controller can be provided. The controller can control the thermal storage fluid medium within the thermal storage system. The controller can include any combination of mechanical or electrical components, including analog and/or digital components and/or computer software. In particular, the controller can control the storage medium flow in tandem with the solar fluid to maintain a desired temperature profile within the thermal storage system for optimal (or at least improved) heat transfer efficiency. For example, during the charging and/or discharging phases, the second reservoir can be maintained at a temperature, $T_H$, above the phase change temperature of the solar fluid (i.e., the boiling point temperature of the solar fluid at the particular pressure). The first reservoir can be maintained at a temperature, $T_C$, above the melting point of the thermal storage medium such that the thermal storage medium remains in a substantially fluid phase so as to allow pumping of the thermal storage fluid from the first reservoir. In addition, the temperature, $T_C$, of the first reservoir can be below the phase change temperature of the solar fluid. The difference between $T_H$ and $T_C$ can be at least 50° C., 100° C., 150° C., 200° C., or more.

The thermal storage system can include a total quantity, $X_{tot}$, of thermal storage medium distributed between the different thermal storage reservoirs depending on the particular mode of operation and time within the mode. For example, the thermal storage system can be constructed to accommodate a total quantity of fluid of at least 100 tons, 500 tons, 1000 tons, 2500 tons, 5000 tons, 10000 tons, 50000 tons, or more. In the fully discharged state (which can be at the beginning of a charge phase), the distribution of thermal storage medium in the thermal storage system can be such that substantially all of the storage fluid is in the cold reservoir. In the fully charged state (which can be at the beginning of a discharge phase), the distribution of the thermal storage medium in the thermal storage system can be such that substantially all of the storage fluid is in hot reservoir.

In one or more embodiments, the thermal storage system can include a control system, either as a shared component with the solar collection system and the electricity generation system (i.e., as part of an overall system controller) or a separate module particular to the thermal storage system (i.e., independent from but potentially interactive with other control modules). The control system can be configured to regulate flow of thermal storage medium within and between the different storage reservoirs. For example, the control system can regulate a rate of media flow between the reservoirs, a timing of the flow, an allocation parameter governing relative quantities of media in the reservoirs, or any other aspect governing the distribution of thermal storage medium within the system. The flow parameters can be governed in accordance with heat transfer parameters of the flow path between reservoirs. For example, the flow parameters can be based, at least in part, on the heat transfer parameters of the heat exchanger, a temperature of the solar fluid flowing through the heat exchangers, a flow rate of the solar fluid flowing through the heat exchangers, the level of the thermal storage medium in the buffer tank or any other aspects or conditions affecting the heat transfer between the thermal storage system and the solar fluid.

The control system can be configured to control other aspects of the overall system, including, for example, one or more parameters of the solar fluid. For example, the control system can be configured to regulate the temperature and/or flow rate of the solar fluid, at least partly in thermal communication with the heat exchanger. Moreover, the control system may regulate the flow of the solar fluid through the one or more heat exchangers, for example, to ensure that the solar fluid condenses or does not fully condense after the enthalpy exchange with the thermal storage fluid during charging in accordance with the operating parameters of the solar collection system. The control system can include any combination of mechanical or electrical components for accomplishing its goals, including but not limited to motors, pumps, valves, analog circuitry, digital circuitry, software (i.e., stored in volatile or non-volatile computer memory or storage), wired or wireless computer network(s) or any other necessary component or combination of components to accomplish its goals.

The temperature of the thermal storage medium can also be monitored within any of the thermal storage reservoirs or combination thereof. The temperature of the solar fluid after heat exchange with the thermal storage system can also be monitored. The control system can regulate flow parameters according to one or more of these measured temperatures. For example, the control system can use the measure temperatures and regulate responsively thereto in order to ensure that the temperature(s) of the solar fluid after heat exchange with the thermal storage system is at or above the boiling point temperature of the solar fluid. The measurement can be accomplished by any device known in the art. For example, the measurement can be direct (e.g., using a thermocouple or infrared sensor) or indirect (e.g., measuring a temperature in a location indicative of fluid temperature within a conduit or reservoir).

The teachings disclosed herein can be useful for increasing solar energy generation efficiency during days of intermittent cloudy periods, maximizing electricity production and/or revenue generation of a solar electric facility, and/or meeting reliability requirements of an electric transmission network operator. At night or other period of relatively low insolation, enthalpy of the thermal storage system (i.e., when the thermal storage system is discharged) is used to evaporate and/or superheat pressurized liquid water (or supercritical fluid) via heat conduction and/or convection between the hotter thermal storage fluid and the cooler pressurized liquid water. This steam generated by enthalpy from the thermal storage system can be used to drive the same turbine (or any other turbine) that was driven during daylight hours by steam generated primarily by insolation. In some embodiments, the turbine driven by enthalpy of the thermal storage system operates at a lower pressure than when drive by insolation alone.

Various embodiments described herein relate to insolation and solar energy. However, this is just one example of a source of intermittent energy. The teachings herein can be applied to other forms of intermittent energy as well, according to one or more contemplated embodiments. Steam can be generated by other sources of energy and used to charge a thermal storage system. For example, fossil fuels, electricity heaters, nuclear energy, or any other source could be used to generate steam for thermal storage. Although aspects of the present disclosure relate to the production of steam using insolation for the production of electricity, it is also contemplated that the teachings presented herein can be applied to solar thermal systems that convert insolation into any of a heated working fluid, mechanical work, and electricity. Although mirrored heliostats with a central solar tower are discussed above, the teachings of the present disclosure are not limited thereto.

Although various embodiments of the thermal storage system are explained in terms of a specific case where the number of reservoirs is two, it is noted that fewer or greater than two reservoirs can also be used according to one or more contemplated embodiments. Moreover, some of the examples discussed herein relate to a single-phase thermal storage system for a multi-phase power generation systems. However, the teachings presented herein are not to be so limited rather, the teachings presented herein can be applicable to multi-phase thermal storage systems according to one or more contemplated embodiments. Moreover, while specific examples have been discussed with respect to using water/steam as a solar fluid, it is further contemplated that other solar fluids can be used as well. For example, salt-water and/or pressurized carbon dioxide can be used as a solar fluid. Other solar fluids are also possible according to one or more contemplated embodiments. In addition, while specific examples have been discussed with respect to using molten salt and/or molten metal as the thermal storage medium, it is contemplated that other types of thermal storage media can be used as well.

It will be appreciated that the modules, processes, systems, and sections described above can be implemented in hardware, hardware programmed by software, software instruction stored on a non-transitory computer readable medium or a combination of the above. A system for controlling the thermal storage system, the solar collection system, and/or the electricity generating system can be implemented, for example, using a processor configured to execute a sequence of programmed instructions stored on a non-transitory computer readable medium. The processor can include, but is not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or storage device which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

Furthermore, the modules, processes, systems, and sections can be implemented as a single processor or as a distributed processor. Further, it should be appreciated that the steps discussed herein can be performed on a single or distributed processor (single and/or multi-core). Also, the processes, modules, and sub-modules described in the various figures of and for embodiments above can be distributed across multiple computers or systems or can be co-located in a single processor or system. Exemplary structural embodiment alternatives suitable for implementing the modules, sections, systems, means, or processes described herein are provided below, but not limited thereto. The modules, processors or systems described herein can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example. Moreover, embodiments of the disclosed method, system, and computer program product can be implemented in software executed on a programmed general purpose computer, a special purpose computer, a microprocessor, or the like.

Embodiments of the method and system (or their subcomponents or modules), can be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, etc. In general, any process capable of implementing the functions or steps described herein can be used to implement embodiments of the method, system, or a computer program product (software program stored on a non-transitory computer readable medium).

Furthermore, embodiments of the disclosed method, system, and computer program product can be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of solar collection, thermal storage, electricity generation, and/or computer programming arts.

Features of the disclosed embodiments can be combined, rearranged, omitted, etc., within the scope of the invention to produce additional embodiments. Furthermore, certain features can sometimes be used to advantage without a corresponding use of other features.

It is thus apparent that there is provided in accordance with the present disclosure, system, methods, and devices for thermal storage. Many alternatives, modifications, and variations are enabled by the present disclosure. While specific embodiments have been shown and described in detail to illustrate the application of the principles of the present invention, it will be understood that the invention can be embodied otherwise without departing from such principles. Accordingly, Applicant intends to embrace all such alternatives, modifications, equivalents, and variations that are within the spirit and scope of the present invention.

The invention claimed is:

1. A solar energy system comprising:
a first solar receiver in which a first storage medium is heated by insolation;
a thermal energy storage system including first and second thermal storage reservoirs for a second storage medium;
a first heat exchanger assembly including one or more heat exchangers for the transfer of enthalpy in the first storage medium to the second storage medium;
a buffer tank located at a height above the first solar receiver and configured to hold the first storage medium, the buffer tank being fluidically connected to the first heat exchanger assembly at its inlet and the first solar receiver at its outlet; and
a second heat exchanger assembly including one or more heat exchangers, the second heat exchanger assembly being configured to enable a heat transfer process between the second storage medium and pressurized water and/or steam during discharging.

2. The system of claim 1, further comprising: a second solar receiver in which pressurized feedwater is heated to generate superheated or supercritical steam by insolation.

3. The system of claim 2, wherein the second heat exchanger assembly is configured to enable a heat transfer process between the generated superheated steam and the second storage medium during charging.

4. The system of claim 1, further comprising: a control system configured to control the thermal storage system such that:
at a first operating period:
the second storage medium flows from the first reservoir through the first heat exchanger assembly to the second reservoir so as to transfer enthalpy from the first storage medium flowing from the first solar receiver to the second storage medium by way of the first heat exchanger assembly; and
the second storage medium flows from the first reservoir through the second heat exchanger assembly to the second reservoir so as to transfer enthalpy from steam flowing from a second solar receiver to the second storage medium by way of the second heat exchanger assembly; and
at a second operating period:
the second storage medium flows from the second reservoir through the second heat exchanger assembly to the first reservoir so as to transfer enthalpy from the second storage medium to pressurized water by way of the second heat exchanger.

5. The system of claim 4, wherein during the first operating period a portion of the first storage medium flows from the first solar receiver through the second heat exchanger assembly so as to transfer enthalpy from the first storage medium to pressurized water and/or steam by way of the second heat exchanger assembly.

6. The system of claim 1, wherein the storage medium in the buffer tank is at atmospheric pressure.

7. The system of claim 1, wherein each of the first storage medium and the second storage medium is a molten salt or a molten metal.

8. The system of claim 1, wherein the first storage medium and the second storage medium are the same.

9. The system of claim 8, wherein the buffer tank is fluidically connected to the thermal energy storage system.

10. The system of claim 1, further comprising: an electricity generating system including a turbine that uses steam to generate electricity, the electricity generating system being coupled to the second heat exchanger assembly so as to receive generated steam therefrom.

11. A method of thermal storage of solar energy, the method comprising:
transferring enthalpy to a second storage medium from a first storage medium so as to increase a temperature of the second storage medium, wherein the first storage medium is heated using solar insolation;
transferring enthalpy to the second storage medium from a portion of a vapor-phase solar fluid at a pressure so as to increase a temperature of the second storage medium, wherein said vapor-phase solar fluid is generated using solar insolation;

wherein the first storage medium flows in a closed loop between a molten salt receiver, a first heat exchanger assembly and a buffer tank and wherein the buffer tank is positioned at a height above the molten salt receiver.

12. The method of claim 11, wherein each of the first storage medium and the second storage medium includes at least one of a molten salt and a molten metal.

13. The method of claim 11, wherein the storage medium is maintained in a liquid phase in the storage reservoirs.

14. A method of generating electricity using insolation, comprising:

at a first operating period:
  generating steam using insolation;
  using a portion of the generated steam to drive a turbine so as to produce electricity;
  directing another portion of the generated steam to a second heat exchanger in thermal communication with a thermal energy storage system including first and second thermal storage reservoirs; and
  at a same time as said directing another portion, flowing a second storage fluid from the first reservoir through the second heat exchanger to the second reservoir such that enthalpy in said another portion of the generated steam is transferred to the second storage fluid by way of the second heat exchanger;
  flowing a first storage fluid from a buffer tank through a molten salt receiver, wherein the first storage fluid is heated using insolation; and
  co-flowing the first storage fluid with the second storage fluid along respective flowpaths through a first heat exchanger such that enthalpy in the first storage fluid is transferred to the second storage fluid; and at a second operating period:
  reverse-flowing the second storage fluid from the second storage reservoir through the second heat exchanger such that enthalpy in the second storage fluid is transferred by way of the second heat exchanger to generate steam; and
  using the steam generated by said reverse-flowing to drive said turbine to produce electricity.

15. The method of claim 14, wherein each of the first storage fluid and the second storage fluid includes at least one of a molten salt and a molten metal.

16. The method of claim 14, wherein the buffer tank is positioned at a height above the molten salt receiver.

17. The method of claim 14, wherein the first storage fluid in the buffer tank is at atmospheric pressure.

18. The method of claim 14, wherein an insolation level during the first operating period is greater than an insolation level during the second operating period.

19. The method of claim 14, wherein the first and second reservoirs are one of a fluid tank and a below grade pool.

20. The method of claim 14, wherein the generating steam and heating of the first storage fluid at the first operating period includes reflecting insolation onto at least one solar receiver using a plurality of heliostats.

21. The method of claim 14, further comprising:
during a third operating period:
  flowing pressurized feedwater together with the first thermal storage fluid along the respective flowpaths through the second heat exchanger such that the enthalpy in the first thermal storage fluid is transferred to the pressurized feedwater so as to produce steam;
  further heating the steam from the second heat exchanger using insolation on a solar receiver to generate superheated steam; and
  driving a turbine using the superheated steam from the solar receiver to generate electricity.

22. The method of claim 21, wherein the third operating period corresponds to a period of relatively high insolation on the solar receiver and when a thermal storage system containing the thermal storage fluid is fully charged.

* * * * *